(12) United States Patent
Wu et al.

(10) Patent No.: US 12,363,578 B2
(45) Date of Patent: *Jul. 15, 2025

(54) INFORMATION REPORTING METHOD AND TERMINAL

(71) Applicant: VIVO MOBILE COMMUNICATION CO., LTD., Guangdong (CN)

(72) Inventors: Kai Wu, Guangdong (CN); Xiaodong Shen, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,792

(22) Filed: May 15, 2024

(65) Prior Publication Data

US 2024/0298207 A1  Sep. 5, 2024

Related U.S. Application Data

(63) Continuation of application No. 17/365,242, filed on Jul. 1, 2021, now Pat. No. 12,015,944, which is a
(Continued)

(30) Foreign Application Priority Data

Jan. 4, 2019 (CN) .......................... 201910009560.6

(51) Int. Cl.
*H04W 24/10* (2009.01)
*H04W 56/00* (2009.01)
(Continued)

(52) U.S. Cl.
CPC ......... *H04W 24/10* (2013.01); *H04W 56/001* (2013.01); *H04W 64/006* (2013.01); *H04W 72/21* (2023.01); *H04W 72/23* (2023.01)

(58) Field of Classification Search
CPC ... H04W 24/10; H04W 24/08; H04W 56/001; H04W 56/0015; H04W 64/006;
(Continued)

(56) References Cited

U.S. PATENT DOCUMENTS

2015/0003361 A1  1/2015  Palat et al.
2019/0053235 A1*  2/2019  Novlan ................. H04L 7/0008
(Continued)

FOREIGN PATENT DOCUMENTS

CN  102421147 A  4/2012
CN  104081855 A  10/2014
(Continued)

OTHER PUBLICATIONS

First Chinese Office Action related to Application No. 201910009560.6; reported on Jan. 22, 2021.
(Continued)

*Primary Examiner* — Candal Elpenord
(74) *Attorney, Agent, or Firm* — von Briesen & Roper, s.c.

(57) ABSTRACT

This disclosure provides an information reporting method and a terminal. The method includes: reporting assistance information for radio resource management RRM measurement to a network-side device, where the assistance information is used by the network-side device to determine an RRM measurement parameter for the terminal.

20 Claims, 2 Drawing Sheets

Report an assistance message for radio resource management RRM measurement to a network-side device, where the assistance message is used by the network-side device to determine an RRM measurement parameter for a terminal — 301

Related U.S. Application Data continuation of application No. PCT/CN2020/070067, filed on Jan. 2, 2020.

(51) Int. Cl.
  *H04W 64/00* (2009.01)
  *H04W 72/04* (2023.01)
  *H04W 72/21* (2023.01)
  *H04W 72/23* (2023.01)

(58) Field of Classification Search
  CPC ....... H04W 72/21; H04W 72/23; H04W 8/24; H04B 17/309; H04B 7/1851
  USPC ......................................................... 370/252
  See application file for complete search history.

(56) References Cited

U.S. PATENT DOCUMENTS

| | | | |
|---|---|---|---|
| 2019/0059105 | A1 | 2/2019 | Harada et al. |
| 2020/0052943 | A1* | 2/2020 | Jassal ................... H04B 17/104 |
| 2020/0137604 | A1 | 4/2020 | Chen et al. |
| 2020/0404690 | A1* | 12/2020 | Lee ........................ H04L 5/005 |
| 2021/0083730 | A1* | 3/2021 | Hwang ................. H04L 5/0092 |
| 2021/0314785 | A1* | 10/2021 | Raghavan ............. H04W 76/11 |
| 2021/0368374 | A1* | 11/2021 | Cheng ................... H04W 80/02 |
| 2022/0046454 | A1 | 2/2022 | Yiu et al. |
| 2022/0345993 | A1 | 10/2022 | Reial et al. |

FOREIGN PATENT DOCUMENTS

| | | |
|---|---|---|
| CN | 104137597 A | 11/2014 |
| CN | 106941658 A | 7/2017 |
| CN | 109041098 A | 12/2018 |
| EP | 3641384 A1 | 4/2020 |
| WO | 2014047795 A1 | 4/2014 |
| WO | 2016117985 A1 | 7/2016 |
| WO | 2018228317 A1 | 12/2018 |

OTHER PUBLICATIONS

First Japanese Office Action related to Application No. 2021-539010; reported on Sep. 6, 2022.

United States Non-Final Office Action related to U.S. Appl. No. 17/365,242; reported on Nov. 2, 2023.

Extended European Search Report related to Application No. 20735947.2; reported on Feb. 2, 2022.

International Search Report and Written Opinion related to Application No. PCT/CN2020/070067; reported on Mar. 24, 2020.

3GPP TR 38.840, 3rd Generation Partnership Project; Technical Specification Group Radio Access Network; Study on US Power Saving; (Release 16).

R1-1811284—Qualcomm Incorporated, "UE Power Consumption Reduction in RRM Measurements", 3GPP TSG-RAN WG1 Meeting #94bis, Oct. 8-12, 2018, Chengdu, China.

R1-1811481—Nokia, Nokia Shanghai Bell, "UE Power Consumption Reduction in RRM Measurements", 3GPP TSG RAN WG1 Meeting #94bis, Chengdu, P.R. China, Oct. 8-12, 2018.

R1-1811914—vivo, "Summary of UE power Consumption Reduction in RRM Measurements", 3GPP TSG RAN WG1 Meeting #94bis, Chengdu, China, Oct. 8-12, 2018.

R1-1811962—vivo, "Offline outcome of UE power Consumption Reduction in RRM Measurements", 3GPP TSG RAN WG1 Meeting #94bis, Chengdu, China, Oct. 8-12, 2018.

R1-1812643—CATT, "UE Power saving scheme for RRM Measurements", 3GPP TSG RAN WG1 Meeting #95, Spokane, USA, Nov. 12-16, 2018.

R1-1813013—Samsung, "UE power consumption reduction in RRM Measurement", 3GPP TSG RAN WG1 Meeting #95, Spokane, USA, Nov. 12-16, 2018.

R1-1813184—Ericsson, "RRM aspects of NR UE power saving", 3GPP TSG RAN WG1 Meeting #94bis, Spokane, USA, Nov. 12-16, 2018.

R1-1813449—Qualcomm Incorporated, "UE Power Consumption Reduction in RRM Measurements", 3GPP TSG RAN WG1 Meeting #94bis, Spokane, USA, Nov. 12-16, 2018.

R1-1813622—Nokia, Nokia Shanghai Bell, "UE Power Consumption Reduction in RRM Measurements", 3GPP TSG RAN WG1 Meeting #95, Spokane, US, Nov. 12-16, 2018.

R1-1813862—vivo, "UE Power Consumption Reduction in RRM Measurements", 3GPP TSG RAN WG1 Meeting #95, Spokane, US, Nov. 12-16, 2018.

R1-1814099—vivo, "Summary of UE power Consumption Reduction in RRM Measurements", 3GPP TSG RAN WG1 Meeting #95, Spokane, USA, Nov. 12-16, 2018.

R1-1814286—vivo, "Summary of UE power Consumption Reduction in RRM Measurements", 3GPP TSG RAN WG1 Meeting #95, Spokane, USA, Nov. 12-16, 2018.

* cited by examiner

| Report an assistance message for radio resource management RRM measurement to a network-side device, where the assistance message is used by the network-side device to determine an RRM measurement parameter for a terminal | — 301 |

INFORMATION REPORTING METHOD AND TERMINAL

CROSS-REFERENCE TO RELATED APPLICATIONS

This application claims the benefit of and is a continuation application of U.S. patent application Ser. No. 17/365,242 filed on Jul. 1, 2021. U.S. patent application Ser. No. 17/365,242 is a continuation application of International Application No. PCT/CN2020/070067 filed on Jan. 2, 2020. International Application No. PCT/CN2020/070067 claims priority to Chinese Patent Application No. 201910009560.6, filed in China on Jan. 4, 2019. Each of the above-listed applications is incorporated herein by reference in its entirety.

TECHNICAL FIELD

Embodiments of this disclosure relate to the field of communications technologies, and in particular, to an information reporting method and a terminal.

BACKGROUND

During communication between a terminal and a network-side device, the terminal is required to perform radio resource management (RRM) measurement on a serving cell and neighboring cells to learn signal fading and signal quality between the terminal and the network-side device.

Currently, a network-side device configures an RRM measurement parameter for a terminal through radio resource control (RRC) signaling, and the terminal performs RRM measurement according to the configuration of the network-side device. It can be seen that, in the related art, the terminal depends on only the configuration of the network-side device to perform RRM measurement, which is not flexible.

SUMMARY

According to a first aspect, an embodiment of this disclosure provides an information reporting method, applied to a terminal, where the method includes: reporting assistance information for radio resource management RRM measurement to a network-side device, where the assistance information is used by the network-side device to determine an RRM measurement parameter for the terminal.

According to a second aspect, an embodiment of this disclosure further provides a terminal, where the terminal includes:
 a reporting module, configured to report assistance information for radio resource management RRM measurement to a network-side device, where the assistance information is used by the network-side device to determine an RRM measurement parameter for the terminal.

According to a third aspect, an embodiment of this disclosure further provides a terminal, where the terminal includes a processor, a memory, and a computer program stored in the memory and capable of running on the processor. When the computer program is executed by the processor, the steps of the information reporting method described above are implemented.

According to a fourth aspect, an embodiment of this disclosure further provides a computer-readable storage medium, where the computer-readable storage medium stores a computer program, and when the computer program is executed by a processor, the steps of the information reporting method described above are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure shall fall within the protection scope of this disclosure.

The terms "first", "second", and the like in this application are used to distinguish between similar objects instead of describing a specific order or sequence. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, the use of "and/or" in this application represents presence of at least one of the connected objects. For example, A and/or B and/or C represents the following seven cases: A alone, B alone, C alone, both A and B, both B and C, both A and C, and all of A, B, and C.

Figure 1:
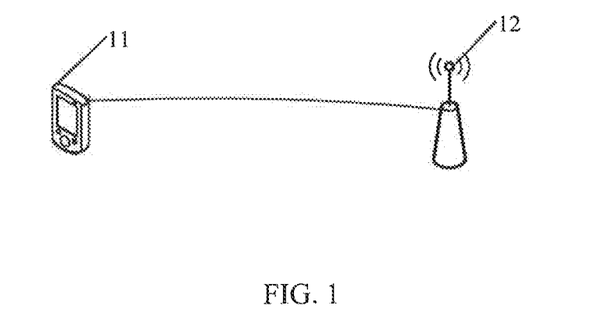
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11 and a network-side device 12, and the terminal 11 and the network-side device 12 may communicate with each other.

In the embodiments of this disclosure, the terminal 11 may also be referred to as user equipment (UE). Optionally, the terminal 11 may be a terminal device such as a mobile phone, a tablet computer, a laptop computer, a personal digital assistant (PDA), a mobile internet device (MID), a wearable device, or an in-vehicle device. It should be noted that the terminal 11 is not limited to a specific type in the embodiments of this disclosure.

The network-side device 12 may be a base station, a relay, an access point, or the like. The base station may be a 5G base station or a base station of a later version (for example, a 5G NR NB), or a base station in another communications system (for example, an eNB (evolved NodeB)). It should be noted that the network-side device 12 is not limited to a specific type in the embodiments of this disclosure.

For ease of understanding, the following describes some content involved in the embodiments of this disclosure.

1. RRM Measurement Parameter

The RRM measurement parameter may include the following:

(1) Synchronization signal block measurement time configuration (SMTC): a first measurement frequency, a duration, a first measurement periodicity, a first reporting periodicity, an index of a measured synchronization signal/physical broadcast channel block (SSB), and the like.

The SMTC is a measurement time configuration for an SSB, and therefore, the duration, the first measurement periodicity, the first reporting periodicity, the index of a measured synchronization signal block (SSB) may be considered as configurations based on SSB measurement.

(2) Measurement object (MO): a cell, a beam, a second measurement frequency, a measurement resource, a second measurement periodicity, a second reporting periodicity, and the like.

The measurement resource, the second measurement periodicity, the second reporting periodicity may be considered as configurations based on measurement of the measurement resource. Optionally, the measurement resource may include an SSB and/or a channel state information (CSI)-RS, and the like. It should be understood that different resources for measurement may correspond to different cells and beams.

(3) Measurement threshold.

The measurement threshold may be understood as a threshold to trigger measurement on a target object, and the target object may be a second target cell, a target beam, or a target frequency.

The second target cell is a neighboring cell of the serving cell of the terminal. The target beam is a second beam other than the first beam. It should be understood that the first beam may be pre-determined, for example, may be pre-configured by a network-side device, or agreed in advance by the network-side device and the terminal. The first beam may be beams of a same cell, or beams of different cells, and the second beam may be beams of a same cell, or beams of different cells. The target frequency is a frequency other than the frequency of the serving cell of the terminal.

Optionally, when an RRM measurement value (for example, a reference signal measurement value) is higher than the measurement threshold, the terminal does not need to perform measurement on a target object; otherwise, the terminal starts measurement on the target object. In this embodiment of this disclosure, the reference signal measurement value may be a reference signal received power (RSRP), a reference signal received quality (RSRQ), or the like.

For example, when a reference signal measurement value of the serving cell of the terminal is higher than the measurement threshold, the terminal may not need to perform measurement on the second target cell and the target frequency.

When a reference signal measurement value of a first beam is higher than the measurement threshold, the terminal may not need to perform measurement on the second beam.

2. Single Frequency Network (SFN) Measurement

Figure 2:
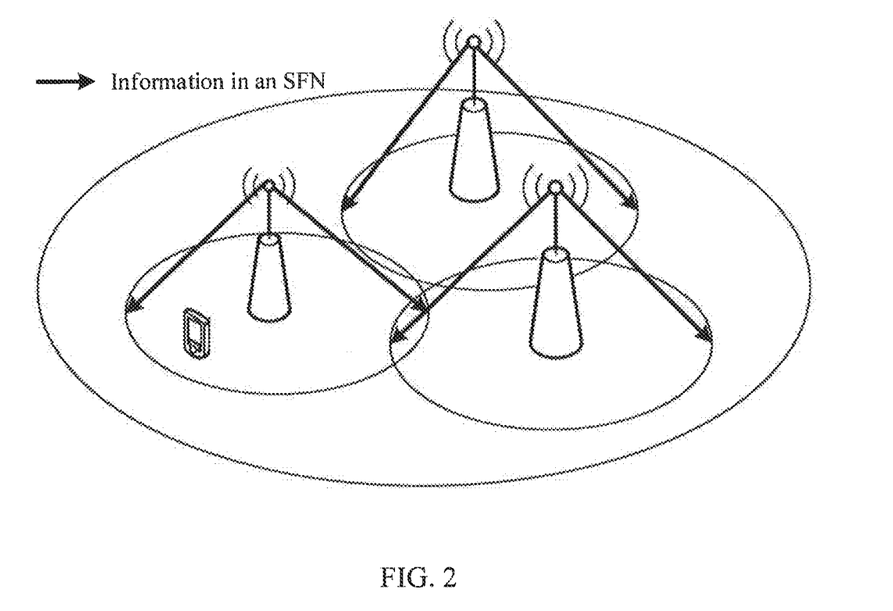
FIG. 2 is a structural diagram of another network system to which an embodiment of this disclosure may be applied.

A network system may be deployed in a manner shown in FIG. 2. As shown in FIG. 2, different cells may transmit physical channels or physical signals on a same time-frequency resource. For example, a plurality of cells may transmit broadcast information such as an SSB, Paging information and system information on a same time-frequency resource, that is, transmitting in an SFN mode. UE may transmit and receive broadcast information on a time-frequency resource of an SFN, including performing RRM measurement.

The following describes the information reporting method in this embodiment of this disclosure.

Figure 3:
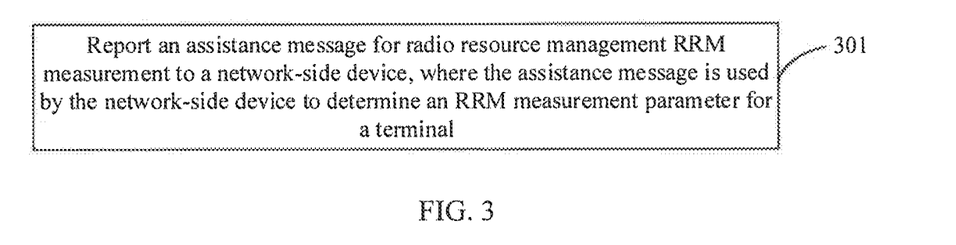
FIG. 3 is a flowchart of an information reporting method according to an embodiment of this disclosure.

FIG. 3 is a flowchart of an information reporting method according to an embodiment of this disclosure. The information reporting method shown in FIG. 3 is applied to a terminal. As shown in FIG. 3, the information reporting method may include the following step:

Step 301: Report assistance information for radio resource management RRM measurement to a network-side device, where the assistance information is used by the network-side device to determine an RRM measurement parameter for the terminal.

Optionally, in an implementation, the assistance information may be specifically used to request the network-side device to configure an RRM measurement parameter, so that the network-side device can perform more appropriate RRM measurement configuration for the terminal. In this implementation, after receiving a response message to the assistance information from the network-side device, the terminal may perform RRM measurement based on the response message.

In another implementation, the assistance information may be specifically used to inform the network-side device of an RRM measurement parameter determined by the terminal. In this implementation, the terminal may determine by itself an RRM measurement parameter for performing RRM measurement according to its own conditions and service requirements, and may directly perform the RRM measurement based on the determined RRM measurement parameter, without waiting for a response message to the assistance information from the network-side device.

The RRM measurement parameter in this step may include at least one of the RRM measurement parameters mentioned in the foregoing content.

It can be seen that in the information reporting method of this embodiment, the terminal may report assistance information for RRM measurement to the network-side device for the network-side device to determine an RRM measurement parameter for the terminal, so that the terminal can perform RRM measurement more flexibly.

In this embodiment of this disclosure, the terminal may actively report RRM measurement assistance information to the network-side device, or may report RRM measurement assistance information to the network-side device when it is detected that a specified condition is met.

Optionally, before the reporting assistance information for RRM measurement to a network-side device, the method further includes:

receiving indication information transmitted by the network-side device, where the indication information is used to indicate whether reporting of the assistance information is supported.

The reporting assistance information for radio resource management RRM measurement to a network-side device includes:

in a case that the indication information indicates that reporting of the assistance information is supported, reporting the assistance information to the network-side device.

Optionally, the indication information may be system information, RRC signaling, a medium access control-control element (MAC-CE) or downlink control information.

This may be specifically determined according to actual needs, and is not limited in this embodiment of this disclosure. For example, the network-side device may indicate in system information whether reporting of assistance information by the terminal is supported.

After receiving the indication information indicating that reporting of assistance information by the terminal is supported, the terminal may report assistance information to the network-side device, so that the terminal can perform RRM measurement more flexibly.

It should be understood that in a case that the terminal receives indication information indicating that reporting of assistance information by the terminal is not supported, the terminal may quit reporting assistance information to the network-side device, so that signaling overheads can be reduced.

In this embodiment of this disclosure, in a case that the assistance information may be specifically used to request the network-side device to configure an RRM measurement parameter, optionally, the assistance information may include at least one of the following:
　　first request information for requesting configuration of an RRM measurement parameter;
　　capability information of the terminal under a single frequency network; and
　　a mobility state of the terminal.

It should be noted that the first request information is intended to request the network-side device to configure an RRM measurement parameter, but specific content contained in the first request information is not limited in this embodiment of this disclosure.

Optionally, the first request information includes or does not include the RRM measurement parameter.

First scenario: An RRM measurement parameter is included in the first request information.

In this scenario, an RRM measurement parameter is carried in the first request information, and therefore, the first request information may be specifically used to request the network-side device to perform RRM measurement parameter configuration according to the RRM measurement parameter carried in the first request information.

Second scenario: No RRM measurement parameter is included in the first request information.

In this scenario, the first request information may be used to request the network-side device to reconfigure an RRM measurement parameter, to reduce power consumption of the terminal in performing RRM measurement.

It should be understood that because no RRM measurement parameter is carried in the first request information, in this scenario, the network-side device determines by itself a reconfigured RRM measurement parameter, with a purpose of reducing power consumption of the terminal in performing RRM measurement.

Optionally, the first request information may only carry bit information used to request the network-side device to reconfigure an RRM measurement parameter.

It can be seen that compared with the first scenario, the first request information in the second scenario may not carry an RRM measurement parameter, and resource occupancy is low, so that signaling overheads may be reduced. In addition, the network-side device determines by itself a reconfigured RRM measurement parameter, with a purpose of reducing power consumption of the terminal in performing RRM measurement, so that power consumed by the terminal in performing an RRM measurement can be reduced.

Compared with the second scenario, an RRM measurement parameter in the first scenario is carried in the first request information, the network-side device may configure a parameter related to the RRM measurement parameter, so that the network-side device may perform more appropriate RRM measurement configuration for the terminal, thereby improving accuracy of the measurement, or reducing unnecessary measurements to reduce measurement power consumption.

Further, the first request information may include at least one of the following:
　　first sub-request information for requesting configuration of a synchronization signal block measurement time configuration SMTC, where the SMTC includes at least one of a duration, a first measurement periodicity, a first reporting periodicity, an index of a measured synchronization signal block SSB, and a first measurement frequency;
　　second sub-request information for requesting configuration of a measurement object, where the measurement object includes at least one of a cell, a beam, a measurement resource, a second measurement frequency, a second measurement periodicity, and a second reporting periodicity; and
　　third sub-request information for requesting configuration of a measurement threshold.

It should be noted that for the sub-request information in the first request information, specific content of the sub-request information is not limited in this disclosure. In the implementation, the sub-request information may include or not include a parameter that is requested to be configured for the sub-request information, such as an SMTC, a measurement object, and a measurement threshold. This may be specifically determined according to actual needs, and is not limited in this embodiment of this disclosure.

For the first sub-request information, it should be understood that the parameter included in the SMTC such as a duration, a first measurement periodicity, or a second reporting periodicity is related to an SSB.

For the second sub-request information, the parameter included in the measurement object such as a second measurement periodicity or a second reporting periodicity is related to a measurement resource. It can be learned from the foregoing content that the measurement resource may include at least one of an SSB and a CSI-RS.

The following describes specific functions of each sub-request information.

Optionally, in a case that the assistance information includes the second sub-request information, the second sub-request information is used to request a first target cell in first cells to serve as a new measurement cell, where
　　a reference signal measurement value of the first target cell is higher than reference signal measurement values of other cells in the first cells different from the first target cell, and the first cells are cells configured by the network-side device and/or cells detected by the terminal.

In the implementation, before reporting assistance information for radio resource management RRM measurement to a network-side device, the terminal may determine the first target cell in the first cells.

Optionally, the terminal may determine the first target cell in the first cells through at least the following two methods.

Method 1: The terminal may determine a cell in first cells with a reference signal measurement value higher than a preset threshold as a first target cell. The preset threshold may be pre-configured by the network-side device.

It should be noted that in a practical application, the terminal may determine a first target cell based on a plurality of measurement results. For example, if the terminal collects m measurement results, a cell whose reference signal measurement values in n measurement results are all higher than a preset threshold in the first cells can be determined as the first target cell, where m and n are both natural numbers, and n is less than m. Optionally, n may be a natural number greater than m/2 and less than m, but is not limited thereto.

Method 2: The terminal may determine k cells with largest reference signal measurement values in first cells as first target cells, where k may be configured by the network-side device, or agreed in advance by the network-side device and the terminal. This may be specifically determined according to actual needs, and is not limited in this embodiment of this disclosure.

It should be noted that in a practical application, the terminal may determine a first target cell based on a plurality of measurement results. For example, the terminal may compare average values of reference signal measurement values of cells in the first cells in a plurality of measurement results, and determine k cells with largest average reference signal measurement values in the first cells as first target cells. However, this is not limited thereto.

In this implementation, in a case that the network-side device accepts the request in the second sub-request information, the terminal may perform measurement only for the first target cell in subsequent RRM measurement, thereby reducing power consumption of the terminal.

Optionally, in a case that the assistance information includes the second sub-request information, the second sub-request information is used to request a target measurement resource in first resources for measurement to serve as a new measurement resource, where a reference signal measurement value of the target measurement resource is higher than reference signal measurement values of other resources for measurement in the first resources for measurement different from the target measurement resource, and the first resources for measurement are resources for measurement configured by the network-side device and/or resources for measurement detected by the terminal.

In the implementation, before reporting assistance information for radio resource management RRM measurement to a network-side device, the terminal may determine a target measurement resource in the first resources for measurement.

Optionally, the terminal may determine the target measurement resource in the first resources for measurement through at least the following two methods.

Method 1: The terminal may determine a measurement resource with a reference signal measurement value higher than a preset threshold in first resources for measurement as a target measurement resource. The preset threshold may be pre-configured by the network-side device.

Method 2: The terminal may determine k resources for measurement with largest reference signal measurement values in first resources for measurement as target resources for measurement, where k may be configured by the network-side device, or agreed in advance by the network-side device and the terminal. This may be specifically determined according to actual needs, and is not limited in this embodiment of this disclosure.

It should be noted that a principle of determining a target measurement resource is similar to a principle of determining a first target cell. For details, refer to the foregoing description of determining a first target cell. Details are not described herein.

Further, in a case that the number of the target resources for measurement is greater than 1, the target resources for measurement are resources for measurement of a same cell, or the target resources for measurement are resources for measurement of different cells.

In this implementation, in a case that the network-side device accepts the request in the second sub-request information, the terminal may perform measurement only for the target resources for measurement in subsequent RRM measurement, thereby reducing power consumption of the terminal.

Optionally, in a case that the assistance information includes the second sub-request information, and the measurement object includes the second measurement periodicity and/or the second reporting periodicity, the second sub-request information is used to request to extend the second measurement periodicity and/or the second reporting periodicity.

In a practical application, if the terminal detects that communication quality between the terminal and the network-side device has not changed much, for example, the terminal is in low mobility, or the terminal is moving in a strong signal coverage area of the serving cell, the terminal may request the network-side device to configure a longer measurement periodicity and/or reporting periodicity, so that the number of measurements and/or the number of reports performed by the terminal may be reduced, thereby reducing power consumption of the terminal.

Optionally, the second sub-request information may carry or not carry a specific measurement periodicity or reporting periodicity recommendation.

Optionally, in a case that the network-side device pre-configures a first measurement threshold, and the assistance information includes the third sub-request information, the third sub-request information is used to request to lower the first measurement threshold, and/or the third sub-request information is used to request to add a second measurement threshold, where the second measurement threshold is lower than the first measurement threshold.

It can be learned from the foregoing content that the measurement threshold is a threshold to trigger measurement on a target object. Optionally, when a reference signal measurement value is higher than the measurement threshold, the terminal does not need to perform measurement on a target object; otherwise, the terminal starts measurement on the target object. For description of the target object, reference may be made to the foregoing content. Details are not described herein again.

Therefore, if the terminal needs to reduce the frequency of starting measurement on a target object, the terminal may request the network-side device to lower the first measurement threshold. In this way, the probability that the reference signal measurement value of the terminal is higher than the lowered first measurement threshold increases, making it harder for the terminal to start measurement on the target object.

It should be noted that when the third sub-request information is used to request lowering of the first measurement threshold, the third sub-request information may include or not include: a lowered first measurement threshold or a first measurement threshold change value.

If the terminal needs to reduce the number of target objects to be measured, the terminal may request the network-side device to add a second measurement threshold that is lower than the first measurement threshold. The terminal does not need to perform measurement on the target object when the reference signal measurement value is higher than the measurement threshold, and the second measurement threshold is lower than the first measurement threshold. Therefore, it can be understood that for the first scenario in which the reference signal measurement value is lower than the first measurement threshold and higher than the second measurement threshold, and the second scenario in which the reference signal measurement value is lower than the second measurement threshold, the number of target objects to be measured in the first scenario is less than the number of target objects to be measured in the second scenario.

In this way, in a scenario in which the reference signal measurement value is lower than the first measurement threshold and higher than the second measurement threshold, the terminal may start measurement on a target object, but in this case, the number of target objects to be measured is less than the number of target objects to be measured in the second scenario, so that the number of target objects to be measured is more flexible, reducing measurement power consumption.

It should be noted that when the third sub-request information is used to request addition of a second measurement threshold, the third sub-request may include or not include the new second measurement threshold.

In addition, the number of new second measurement thresholds may be determined according to actual needs, and is not limited in this embodiment of this disclosure.

Furthermore, different target objects may correspond to different measurement thresholds, for example, an S-measure threshold for triggering measurement on a second target cell, and a B-measure threshold for triggering measurement on a target beam.

It can be learned from the foregoing content that the terminal may perform RRM measurement on a time-frequency resource of an SFN. It is well known that when the terminal performs RRM measurement on a time-frequency resource of an SFN, measurement power consumption may be reduced compared with performing RRM measurement on a measurement resource of a non-SFN. Therefore, in this embodiment of this disclosure, assistance information may include capability information of the terminal in an SFN for indicating whether the terminal has an information reception capability under the single frequency network, so that the network-side device may determine whether to configure an SSB, a CSI-RS, or other RS resources to be transmitted in an SFN form for UE to perform RRM measurement, and determine whether to transmit paging information, a broadcast signal, and broadcast information in an SFN form.

Optionally, in a case that the assistance information includes the capability information, and the capability information indicates that the terminal has an information reception capability under the single frequency network, the assistance information further includes second request information, where the second request information is used to request the network-side device to perform transmission of a broadcast signal, broadcast information, and paging information under the single frequency network.

Optionally, in a case that the terminal has an information reception capability under the single frequency network, the terminal may request the network-side device to perform measurement configuration under the SFN and transmission of paging information. In this way, the terminal may transmit and receive paging information, SSBs and other downlink broadcast signals based on SFN resources configured by the network-side device, thereby reducing measurement power consumption.

In this embodiment of this disclosure, RRM measurement is mainly used to measure signal quality between a terminal and a network-side device, and for a terminal in a resting or low mobility state, it is not necessary to perform RRM measurement too frequently. Therefore, the assistance information may include a mobility state of the terminal, so that the network-side device may configure, based on the mobility state of the terminal, an RRM measurement parameter for the terminal to perform RRM measurement, thereby reducing power consumption of the terminal.

In this embodiment of this disclosure, the terminal may determine its own mobility state in a plurality of ways. Optionally, the mobility state is determined according to at least one of the following: a direction of arrival (DOA) measurement result, a measured RS timing offset, a Doppler measurement result, and measurement information corresponding to a satellite communications system, but is not limited thereto.

It should be noted that various optional implementations described in this embodiment of this disclosure may be implemented in combination or may be implemented independently, which is not limited in this embodiment of this disclosure.

The information reporting method in this embodiment of this disclosure may include:

1. UE transmits at least one of the following RRM measurement-related assistance information to a network-side device:
   a) a request SMTC configuration, an SMTC duration, and an index of a measured SSB.
   b) MO information requested to be configured by the network-side device, and an MO configuration requested to be configured by the network-side device:
   a cell index, a beam index, a measurement RS resource index, and an MO configuration index, where
   the MO information may be understood as recommendation information, and may carry no RRM measurement parameter; and the MO configuration may carry an RRM measurement parameter.
   c) a measurement periodicity and a reporting periodicity requested to be configured.
   d) the number of cell- or beam-level S-measure thresholds and threshold values requested to be configured; the number of neighboring cells and the number of neighboring frequencies to be measured.
   e) whether the UE has a reception capability under an SFN network, which is reported to the network-side device by the UE.

When the UE has the reception capability under the SFN network, the UE may request the network-side device to perform measurement configuration under the SFN network and perform transmission of paging information.

2. The network-side device indicates in system information, RRC signaling, a MAC-CE or a downlink control channel whether reporting of the assistance information by the UE is supported.

For ease of understanding, the following examples are described.

Embodiment 1

After a long-term measurement, the UE finds that cell0, cell1, and cell2 are cells with the best indicators such as RSRP and RSRQ for a relatively long period of time. However, the network side device has configured measurements on cells 0 to 6.

The UE transmits feedback information to the network-side device, indicating to the network-side device that measurements on cell0, cell1, and cell2 continue, and measurements on cells 3 to 6 stop.

Embodiment 2

After a long-term measurement, the UE finds that SSB0 and SSB2 of the current serving cell are resources for measurement with the best indicators such as RSRP and RSRQ for a relatively long period of time. However, the network side device has configured measurements on SSBs 0 to 4.

The UE transmits feedback information to the network-side device, indicating to the network-side device that SSB0 and SSB2 are still used as resources for measurement, and measurements on SSB1, SSB3, and SSB4 stop.

Embodiment 3

After a long-term measurement, the UE finds that SSB0 of cell0 and SSB1 of cell1 are resources for measurement with the best indicators such as RSRP and RSRQ for a relatively long period of time. However, the network side device has configured measurements on SSB0 to SSB4 of cells 0 to 4.

The UE transmits feedback information to the network-side device, indicating to the network-side device that SSB0 of cell0 and SSB1 of cell1 are still used as resources for measurement, and measurements on SSBs of other cells stop.

Embodiment 4

The UE transmits feedback information to the network-side device, expecting lowering an S-measure threshold, to make it harder to start neighboring cell measurement. The request information or requested S-measure threshold may be transmitted.

The UE transmits feedback information to the network-side device, expecting reduction of the number of neighboring cells to be measured. The UE may request the network-side device to configure another S-measure2 threshold. If the S-measure threshold is not met, but the S-measure2 threshold is met, X neighboring cells are to be measured. If the S-measure2 threshold is not met, all configured cells or cells detected by the UE are measured. It should be understood that the number X of neighboring cells is less than the number of configured cells or cells detected by the UE.

In this embodiment, the S-measure thresholds are RSRP and RSRQ thresholds for cell-level measurement, and target objects are target cells, that is, neighboring cells of the serving cell of the terminal.

Embodiment 5

It is assumed that the measurement threshold is a threshold to control the number of RS-level measurements. A higher threshold means fewer RS measurements to be performed, and generally beams corresponding to an RS may be different, that is, fewer beams are to be measured. For example, when measurement values of N optimal beams such as RSRP and RSRQ are higher than corresponding thresholds, no measurement on other beams is performed; otherwise, measurements on other beams are started. In this embodiment, the threshold is described as a B-measure threshold. In this embodiment, the B-measure thresholds are RSRP and RSRQ thresholds for RS-level measurements, and target objects are target beams. It should be noted that the foregoing N beams can be understood as the first beam in the foregoing content.

The UE transmits feedback information to the network-side device, expecting lowering a threshold in the B-measure that triggers a target beam measurement, to make it harder to start a target beam measurement. The request information or requested B-measure threshold may be transmitted.

The UE transmits feedback information to the network-side device, expecting reduction of the number of neighboring beams to be measured. The UE may request the network-side device to configure another B-measure2 threshold. If the B-measure threshold is not met, but the B-measure2 threshold is met, X neighboring beams are to be measured. If the B-measure2 threshold is not met, all configured beams or beams of the cells detected by the UE are measured. It should be understood that X is less than the number of configured beams or beams of the cells detected by the UE.

In this embodiment, whether the X beams or N beams come from a same cell is not limited. In other words, the X beams may be beams of a same cell, or may be beams of different cells, and the N beams may be beams of a same cell, or may be beams of different cells.

Embodiment 6

The UE transmits a request to extend a measurement periodicity and a reporting periodicity to the network-side device, or transmits a specific measurement periodicity or reporting periodicity recommendation to the network-side device.

Embodiment 7

Whether the UE is in a low mobility state is fed back to the network-side device.

Optionally, the UE may determine whether the UE is in a low mobility state in at least one of the following ways:
  i. The UE determines, based on DOA measurement, whether it is in a low mobility state.
  ii. The UE determines, based on a measured RS timing offset, whether it is in a low mobility state.
  iii. The UE determines, based on Doppler measurement, whether it is in a low mobility state.
  iv. The UE determines, based on measurement information corresponding to a satellite communications system such as GPS and Beidou, whether it is in a low mobility state.

Embodiment 8

The UE reports to the network-side device whether the UE has a reception capability under an SFN network.

In a case that the UE has the reception capability under the SFN network, the UE may request the network-side device to perform measurement configuration under the SFN network and perform transmission of paging information.

The UE may receive paging channels, SSBs and other downlink broadcast signals based on SFN resources configured by the network-side device.

This disclosure includes at least the following innovations:

1. UE reports various types of assistance information to a network-side device.
2. The network-side device indicates whether reporting of the foregoing assistance information by the UE is supported.

This disclosure has at least the following beneficial effects:

The UE may report to or request from the network-side device a specified RRM measurement configuration, and the UE may perform measurement based on the requested specified measurement configuration. Compared with a current configuration, the requested specified measurement configuration helps to save power or improve precision of measurement.

Figure 4:
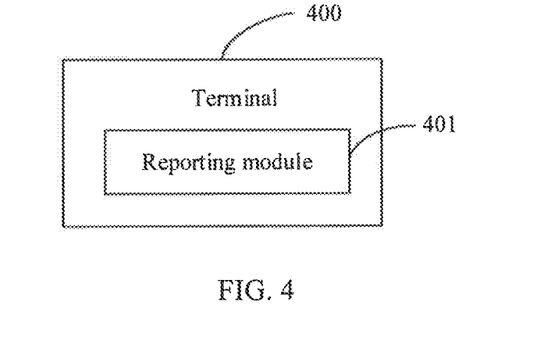
FIG. 4 is a first structural diagram of a terminal according to an embodiment of this disclosure.

FIG. 4 is a first structural diagram of a terminal according to an embodiment of this disclosure. As shown in FIG. 4, the terminal 400 includes:

a reporting module 401, configured to report assistance information for radio resource management RRM measurement to a network-side device, where the assistance information is used by the network-side device to determine an RRM measurement parameter for the terminal.

Optionally, the terminal 400 further includes:

a receiving module, configured to receive, before reporting of the assistance information for radio resource management RRM measurement to the network-side device, indication information transmitted by the network-side device, where the indication information is used to indicate whether reporting of the assistance information is supported.

The reporting module 401 is specifically configured to:

in a case that the indication information indicates that reporting of the assistance information is supported, report the assistance information to the network-side device.

Optionally, the assistance information includes at least one of the following:

first request information for requesting configuration of an RRM measurement parameter;

capability information of the terminal under a single frequency network; and a mobility state of the terminal.

Optionally, the first request information includes or does not include the RRM measurement parameter.

Optionally, the first request information includes at least one of the following:

first sub-request information for requesting configuration of a synchronization signal block measurement time configuration SMTC, where the SMTC includes at least one of a duration, a first measurement periodicity, a first reporting periodicity, an index of a measured synchronization signal block SSB, and a first measurement frequency;

second sub-request information for requesting configuration of a measurement object, where the measurement object includes at least one of a cell, a beam, a measurement resource, a second measurement frequency, a second measurement periodicity, and a second reporting periodicity; and third sub-request information for requesting configuration of a measurement threshold.

Optionally, in a case that the assistance information includes the second sub-request information, the second sub-request information is used to request a first target cell in first cells to serve as a new measurement cell, where a reference signal measurement value of the first target cell is higher than reference signal measurement values of other cells in the first cells different from the first target cell, and the first cells are cells configured by the network-side device and/or cells detected by the terminal.

Optionally, in a case that the assistance information includes the second sub-request information, the second sub-request information is used to request a target measurement resource in first resources for measurement to serve as a new measurement resource, where a reference signal measurement value of the target measurement resource is higher than reference signal measurement values of other resources for measurement in the first resources for measurement different from the target measurement resource, and the first resources for measurement are resources for measurement configured by the network-side device and/or resources for measurement detected by the terminal.

Optionally, in a case that the number of the target resources for measurement is greater than 1, the target resources for measurement are resources for measurement of a same cell, or the target resources for measurement are resources for measurement of different cells.

Optionally, in a case that the assistance information includes the second sub-request information, and the measurement object includes the second measurement periodicity and/or the second reporting periodicity, the second sub-request information is used to request to extend the second measurement periodicity and/or the second reporting periodicity.

Optionally, in a case that the network-side device preconfigures a first measurement threshold, and the assistance information includes the third sub-request information, the third sub-request information is used to request to lower the first measurement threshold, and/or the third sub-request information is used to request to add a second measurement threshold, where the second measurement threshold is lower than the first measurement threshold.

Optionally, in a case that the assistance information includes the capability information, and the capability information indicates that the terminal has an information reception capability under the single frequency network, the assistance information further includes second request information, where the second request information is used to request the network-side device to perform transmission of a broadcast signal, broadcast information, and paging information under the single frequency network.

Optionally, the mobility state is determined based on at least one of the following: a direction of arrival DOA measurement result, a measured RS timing offset, a Doppler measurement result, and measurement information corresponding to a satellite communications system.

The terminal 400 can implement the processes in the method embodiments of this disclosure, with the same beneficial effects achieved. To avoid repetition, details are not described herein.

Figure 5:
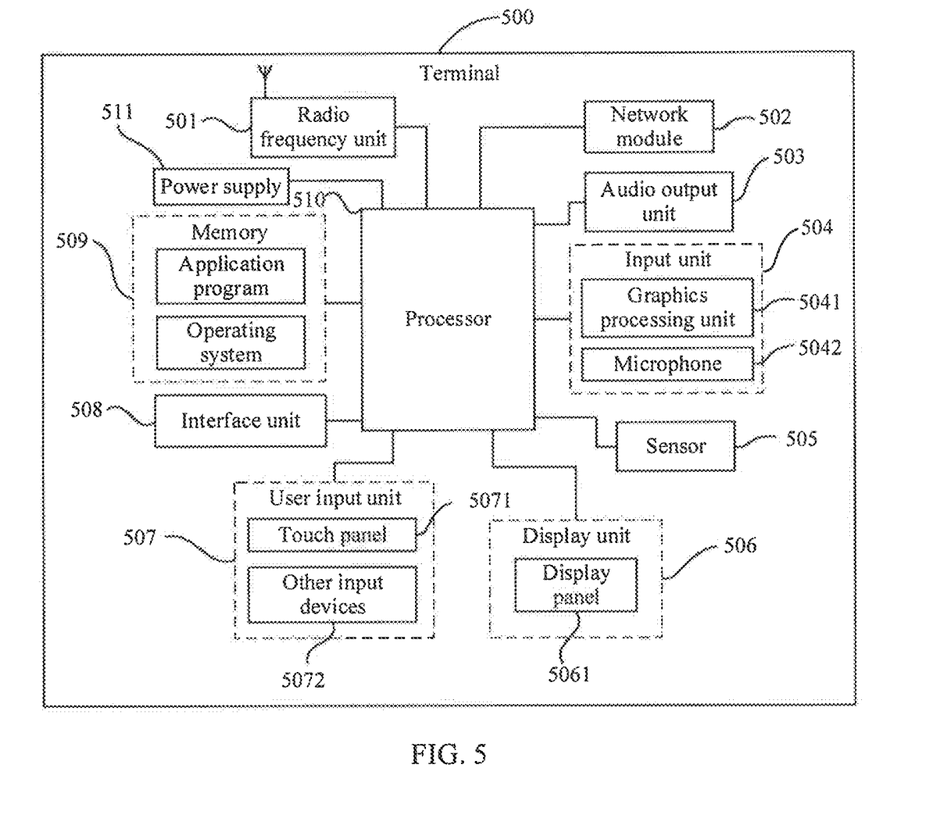
FIG. 5 is a second structural diagram of a terminal according to an embodiment of this disclosure.

FIG. 5 is a second structural diagram of a terminal according to an embodiment of this disclosure. The terminal may be implemented as that shown in a schematic diagram of a hardware structure of the terminal in the embodiments of this disclosure. As shown in FIG. 5, the terminal 500 includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the terminal shown in FIG. 5 does not constitute a limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 501 is configured to: report assistance information for radio resource management RRM measurement to a network-side device, where the assistance information is used by the network-side device to determine an RRM measurement parameter for the terminal.

Optionally, the radio frequency unit 501 is further configured to: receive indication information transmitted by the network-side device, where the indication information is used to indicate whether reporting of the assistance information is supported; and in a case that the indication information indicates that reporting of the assistance information is supported, report the assistance information to the network-side device.

Optionally, the assistance information includes at least one of the following:
  first request information for requesting configuration of an RRM measurement parameter;
  capability information of the terminal under a single frequency network; and
  a mobility state of the terminal.

Optionally, the first request information includes or does not include the RRM measurement parameter.

Optionally, the first request information includes at least one of the following:
  first sub-request information for requesting configuration of a synchronization signal block measurement time configuration SMTC, where the SMTC includes at least one of a duration, a first measurement periodicity, a first reporting periodicity, an index of a measured synchronization signal block SSB, and a first measurement frequency;
  second sub-request information for requesting configuration of a measurement object, where the measurement object includes at least one of a cell, a beam, a measurement resource, a second measurement frequency, a second measurement periodicity, and a second reporting periodicity; and
  third sub-request information for requesting configuration of a measurement threshold.

Optionally, in a case that the assistance information includes the second sub-request information, the second sub-request information is used to request a first target cell in first cells to serve as a new measurement cell, where
  a reference signal measurement value of the first target cell is higher than reference signal measurement values of other cells in the first cells different from the first target cell, and the first cells are cells configured by the network-side device and/or cells detected by the terminal.

Optionally, in a case that the assistance information includes the second sub-request information, the second sub-request information is used to request a target measurement resource in first resources for measurement to serve as a new measurement resource, where
  a reference signal measurement value of the target measurement resource is higher than reference signal measurement values of other resources for measurement in the first resources for measurement different from the target measurement resource, and the first resources for measurement are resources for measurement configured by the network-side device and/or resources for measurement detected by the terminal.

Optionally, in a case that the number of the target resources for measurement is greater than 1, the target resources for measurement are resources for measurement of a same cell, or the target resources for measurement are resources for measurement of different cells.

Optionally, in a case that the assistance information includes the second sub-request information, and the measurement object includes the second measurement periodicity and/or the second reporting periodicity, the second sub-request information is used to request to extend the second measurement periodicity and/or the second reporting periodicity.

Optionally, in a case that the network-side device preconfigures a first measurement threshold, and the assistance information includes the third sub-request information, the third sub-request information is used to request to lower the first measurement threshold, and/or the third sub-request information is used to request to add a second measurement threshold, where the second measurement threshold is lower than the first measurement threshold.

Optionally, in a case that the assistance information includes the capability information, and the capability information indicates that the terminal has an information reception capability under the single frequency network, the assistance information further includes second request information, where the second request information is used to request the network-side device to perform transmission of a broadcast signal, broadcast information, and paging information under the single frequency network.

Optionally, the mobility state is determined based on at least one of the following: a direction of arrival DOA measurement result, a measured RS timing offset, a Doppler measurement result, and measurement information corresponding to a satellite communications system.

It should be noted that the terminal 500 in this embodiment is capable of implementing the processes of the method embodiments in the embodiments of this disclosure, with the same beneficial effects achieved. To avoid repetition, details are not described herein.

It should be understood that, in this embodiment of this disclosure, the radio frequency unit 501 may be configured to transmit or receive a signal in an information transmitting/receiving or call process. Optionally, the radio frequency unit 501 receives downlink data from a base station and transmits the downlink data to the processor 510 for processing, and transmits uplink data to the base station. Generally, the radio frequency unit 501 includes but is not limited to an antenna, at least one amplifier, a transceiver, a coupler, a low noise amplifier, a duplexer, and the like. In addition, the radio frequency unit 501 may further communicate with a network and another device through a wireless communications system.

The terminal provides wireless broadband internet access for a user by using the network module 502, for example, helps the user send and receive e-mails, browse web pages, and access streaming media.

The audio output unit 503 may convert audio data received by the radio frequency unit 501 or the network module 502 or stored in the memory 509 into an audio signal and output the audio signal as a sound. In addition, the audio output unit 503 may further provide audio output (for example, a call signal reception tone or a message reception tone) that is related to a specific function performed by the terminal 500. The audio output unit 503 includes a speaker, a buzzer, a receiver, and the like.

The input unit 504 is configured to receive an audio signal or a video signal. The input unit 504 may include a graphics processing unit (GPU) 5041 and a microphone 5042. The graphics processing unit 5041 processes image data of a static picture or a video obtained by an image capture apparatus (for example, a camera) in an image capture mode or a video capture mode. A processed image frame may be displayed on the display unit 506. An image frame processed by the graphics processing unit 5041 may be stored in the memory 509 (or another storage medium) or transmitted by the radio frequency unit 501 or the network module 502. The microphone 5042 may receive a sound, and can process the sound into audio data. The processed audio data may be converted in a telephone call mode into a format that can be transmitted by the radio frequency unit 501 to a mobile communications base station, for outputting.

The terminal 500 further includes at least one sensor 505, for example, an optical sensor, a motion sensor, and other sensors. Optionally, the optical sensor includes an ambient light sensor and a proximity sensor. The ambient light sensor may adjust luminance of the display panel 5061 based on brightness of ambient light, and the proximity sensor may turn off the display panel 5061 and/or backlight when the terminal 500 moves close to an ear. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as pedometer and tapping), and the like. The sensor 505 may also include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information input by the user or information provided for the user. The display unit 506 may include the display panel 5061, and the display panel 5061 may be configured in a form of a liquid crystal display (LCD), an organic light-emitting diode (OLED), or the like.

The user input unit 507 may be configured to receive input digit or character information, and generate key signal input that is related to user setting and function control of the terminal. Optionally, the user input unit 507 includes a touch panel 5071 and other input devices 5072. The touch panel 5071 is also referred to as a touchscreen, and may collect a touch operation of the user on or near the touch panel (for example, an operation performed on or near the touch panel 5071 by the user by using any appropriate object or accessory such as a finger or a stylus). The touch panel 5071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 510, and receives and executes a command transmitted by the processor 510. In addition, the touch panel 5071 may be implemented in a plurality of types, for example, as a resistive, capacitive, infrared, or surface acoustic wave touch panel. In addition to the touch panel 5071, the user input unit 507 may further include the other input devices 5072. Optionally, the other input devices 5072 may include but are not limited to a physical keyboard, a function key (for example, a volume control key or a power on/off key), a trackball, a mouse, a joystick, and the like. Details are not described herein.

Further, the touch panel 5071 may cover the display panel 5061. After detecting a touch operation on or near the touch panel 5071, the touch panel 5071 transmits the touch operation to the processor 510 to determine a type of a touch event. Then the processor 510 provides corresponding visual output on the display panel 5061 based on the type of the touch event. Although the touch panel 5071 and the display panel 5061 are used as two separate components to implement input and output functions of the terminal in FIG. 5, the touch panel 5071 and the display panel 5061 may be integrated to implement the input and output functions of the terminal in some embodiments. This is not specifically limited herein.

The interface unit 508 is an interface for connecting an external apparatus to the terminal 500. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 508 may be configured to receive input (for example, data information and electric power) from the external apparatus, and transmit the received input to one or more elements in the terminal 500; or may be configured to transmit data between the terminal 500 and the external apparatus.

The memory 509 may be configured to store software programs and various types of data. The memory 509 may mainly include a program storage area and a data storage area. The program storage area may store an operating system, an application program required by at least one function (for example, an audio play function or an image play function), and the like. The data storage area may store data (for example, audio data and a phone book) created based on usage of the mobile phone. In addition, the memory 509 may include a high-speed random access memory, or may further include a nonvolatile memory, for example, at least one magnetic disk storage device or a flash memory device, or other volatile solid-state storage devices.

The processor 510 is a control center of the terminal, and is connected to all components of the terminal by using various interfaces and lines. By running or executing a software program and/or a module stored in the memory 509 and invoking data stored in the memory 509, the processor 510 executes various functions of the terminal and processes data, so as to perform overall monitoring on the terminal. The processor 510 may include one or more processing units. Optionally, the processor 510 may integrate an application processor and a modem processor. The application processor mainly processes an operating system, a user interface, an application program, and the like. The modem processor mainly processes wireless communication. It may be understood that the modem processor may alternatively not be integrated into the processor 510.

The terminal 500 may further include a power supply 511 (for example, a battery) that supplies power to each component. Optionally, the power supply 511 may be logically connected to the processor 510 by using a power management system, so as to implement functions such as charging management, discharging management, and power consumption management by using the power management system.

In addition, the terminal 500 includes some functional modules that are not shown. Details are not described herein.

Optionally, an embodiment of this disclosure further provides a terminal, including a processor 510, a memory 509, and a computer program stored in the memory 509 and capable of running on the processor 510. When the computer program is executed by the processor 510, the processes of the foregoing embodiments of the information reporting method are implemented, with the same technical effects achieved. To avoid repetition, details are not described herein.

An embodiment of this disclosure further provides a computer-readable storage medium, where the computer-readable storage medium stores a computer program. When the computer program is executed by a processor, the processes of the foregoing embodiments of the information reporting method are implemented, with the same technical effects achieved. To avoid repetition, details are not described herein. For example, the computer-readable storage medium is a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, however, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An information reporting method, comprising:
   reporting, by a terminal, assistance information for radio resource management (RRM) measurement to a network-side device, wherein the assistance information is used by the network-side device to determine an RRM measurement parameter for the terminal;
   wherein the assistance information comprises capability information of the terminal under a single frequency network;
   wherein in a case that the assistance information comprises the capability information, and the capability information indicates that the terminal has an information reception capability under the single frequency network, the assistance information further comprises first request information, wherein the first request information is used to request the network-side device to perform transmission of a broadcast signal, broadcast information, and paging information under the single frequency network.

2. The method according to claim 1, wherein before the reporting assistance information for radio resource management (RRM) measurement to a network-side device by the terminal, the method further comprises:
   receiving indication information transmitted by the network-side device, wherein the indication information is used to indicate whether reporting of the assistance information is supported; and
   the reporting assistance information for radio resource management (RRM) measurement to a network-side device by the terminal comprises:
   in a case that the indication information indicates that reporting of the assistance information is supported, reporting the assistance information to the network-side device.

3. The method according to claim 1, wherein the assistance information further comprises at least one of the following:
   second request information for requesting configuration of an RRM measurement parameter; or
   a mobility state of the terminal.

4. The method according to claim 3, wherein the second request information comprises or does not comprise the RRM measurement parameter.

5. The method according to claim 3, wherein the second first request information comprises at least one of the following:
   first sub-request information for requesting configuration of a synchronization signal block measurement time configuration (SMTC), wherein the SMTC comprises at least one of a duration, a first measurement periodicity, a first reporting periodicity, an index of a measured synchronization signal block (SSB), or a first measurement frequency;
   second sub-request information for requesting configuration of a measurement object, wherein the measurement object comprises at least one of a cell, a beam, a measurement resource, a second measurement frequency, a second measurement periodicity, or a second reporting periodicity; or
   third sub-request information for requesting configuration of a measurement threshold.

6. The method according to claim 5, wherein in a case that the assistance information comprises the second sub-request information, the second sub-request information is used to request a first target cell in first cells to serve as a new measurement cell, wherein
   a reference signal measurement value of the first target cell is higher than reference signal measurement values of other cells in the first cells different from the first target cell, and the first cells are cells configured by the network-side device and/or cells detected by the terminal.

7. The method according to claim 5, wherein in a case that the assistance information comprises the second sub-request information, and the measurement object comprises the second measurement periodicity and/or the second reporting periodicity, the second sub-request information is used to request to extend the second measurement periodicity and/or the second reporting periodicity.

8. The method according to claim 5, wherein in a case that the network-side device pre-configures a first measurement threshold, and the assistance information comprises the third sub-request information, the third sub-request information is used to request to lower the first measurement threshold, and/or the third sub-request information is used to request to add a second measurement threshold, wherein the second measurement threshold is lower than the first measurement threshold.

9. The method according to claim 3, wherein the mobility state is determined based on at least one of the following: a direction of arrival (DOA) measurement result, a measured RS timing offset, a Doppler measurement result, or measurement information corresponding to a satellite communications system.

10. A terminal, comprising a processor, a memory, and a computer program stored in the memory and capable of running on the processor, wherein the computer program is executed by the processor to implement:
reporting assistance information for radio resource management (RRM) measurement to a network-side device, wherein the assistance information is used by the network-side device to determine an RRM measurement parameter for the terminal;
wherein the assistance information comprises capability information of the terminal under a single frequency network;
wherein in a case that the assistance information comprises the capability information, and the capability information indicates that the terminal has an information reception capability under the single frequency network, the assistance information further comprises first request information, wherein the first request information is used to request the network-side device to perform transmission of a broadcast signal, broadcast information, and paging information under the single frequency network.

11. The terminal according to claim 10, wherein the computer program is further executed by the processor to implement:
receiving indication information transmitted by the network-side device, wherein the indication information is used to indicate whether reporting of the assistance information is supported; and
in a case that the indication information indicates that reporting of the assistance information is supported, reporting the assistance information to the network-side device.

12. The terminal according to claim 10, wherein the assistance information further comprises at least one of the following:
second request information for requesting configuration of an RRM measurement parameter; or
a mobility state of the terminal.

13. The terminal according to claim 12, wherein the second request information comprises or does not comprise the RRM measurement parameter.

14. The terminal according to claim 12, wherein the second request information comprises at least one of the following:
first sub-request information for requesting configuration of a synchronization signal block measurement time configuration (SMTC), wherein the SMTC comprises at least one of a duration, a first measurement periodicity, a first reporting periodicity, an index of a measured synchronization signal block (SSB), or a first measurement frequency;
second sub-request information for requesting configuration of a measurement object, wherein the measurement object comprises at least one of a cell, a beam, a measurement resource, a second measurement frequency, a second measurement periodicity, or a second reporting periodicity; or
third sub-request information for requesting configuration of a measurement threshold.

15. The terminal according to claim 14, wherein in a case that the assistance information comprises the second sub-request information, the second sub-request information is used to request a first target cell in first cells to serve as a new measurement cell, wherein
a reference signal measurement value of the first target cell is higher than reference signal measurement values of other cells in the first cells different from the first target cell, and the first cells are cells configured by the network-side device and/or cells detected by the terminal.

16. The terminal according to claim 14, wherein in a case that the assistance information comprises the second sub-request information, and the measurement object comprises the second measurement periodicity and/or the second reporting periodicity, the second sub-request information is used to request to extend the second measurement periodicity and/or the second reporting periodicity.

17. The terminal according to claim 14, wherein in a case that the network-side device pre-configures a first measurement threshold, and the assistance information comprises the third sub-request information, the third sub-request information is used to request to lower the first measurement threshold, and/or the third sub-request information is used to request to add a second measurement threshold, wherein the second measurement threshold is lower than the first measurement threshold.

18. The terminal according to claim 12, wherein the mobility state is determined based on at least one of the following: a direction of arrival (DOA) measurement result, a measured RS timing offset, a Doppler measurement result, or measurement information corresponding to a satellite communications system.

19. A non-transitory computer-readable storage medium, wherein the non-transitory computer-readable storage medium stores a computer program, and the computer program is executed by a processor to implement:
reporting assistance information for radio resource management (RRM) measurement to a network-side device, wherein the assistance information is used by the network-side device to determine an RRM measurement parameter for the terminal;
wherein the assistance information comprises capability information of the terminal under a single frequency network;
wherein in a case that the assistance information comprises the capability information, and the capability information indicates that the terminal has an information reception capability under the single frequency network, the assistance information further comprises first request information, wherein the first request information is used to request the network-side device to perform transmission of a broadcast signal, broadcast information, and paging information under the single frequency network.

20. The non-transitory computer-readable storage medium according to claim 19, wherein the assistance information further comprises at least one of the following:
    second request information for requesting configuration of an RRM measurement parameter; or
    a mobility state of the terminal.

\* \* \* \* \*